(12) United States Patent
Imura

(10) Patent No.: US 9,935,327 B2
(45) Date of Patent: Apr. 3, 2018

(54) FUEL CELL AND METHOD FOR PRODUCING THE SAME

(75) Inventor: Shinichiro Imura, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 736 days.

(21) Appl. No.: 14/002,051

(22) PCT Filed: Mar. 14, 2012

(86) PCT No.: PCT/JP2012/001788
§ 371 (c)(1),
(2), (4) Date: Aug. 28, 2013

(87) PCT Pub. No.: WO2012/124326
PCT Pub. Date: Sep. 20, 2012

(65) Prior Publication Data
US 2013/0337361 A1    Dec. 19, 2013

(30) Foreign Application Priority Data

Mar. 14, 2011    (JP) .................................. 2011-055814

(51) Int. Cl.
*H01M 8/2418*    (2016.01)
*H01M 8/241*    (2016.01)
(Continued)

(52) U.S. Cl.
CPC ............. *H01M 8/241* (2013.01); *H01M 8/00* (2013.01); *H01M 8/006* (2013.01);
(Continued)

(58) Field of Classification Search
CPC .................................................. H01M 8/2418
See application file for complete search history.

(56) References Cited

U.S. PATENT DOCUMENTS

2004/0071865 A1    4/2004    Mosdale et al.
2004/0086762 A1    5/2004    Maeda et al.
(Continued)

FOREIGN PATENT DOCUMENTS

JP    2003-197225 A    7/2003
JP    2004-517446 A    6/2004
(Continued)

OTHER PUBLICATIONS

International Search Report of PCT/JP2012/001788, dated Jun. 19, 2012.

*Primary Examiner* — Milton I Cano
*Assistant Examiner* — Haixia Zhang
(74) *Attorney, Agent, or Firm* — Westerman, Hattori, Daniels & Adrian, LLP

(57) ABSTRACT

Composite members, a fuel cell and manufacturing method, where the composite members are mounted on a base and comprise a first insulator and a second insulator layered on either side of an interconnector, exposed in a chamfered portion on opposite corners. Between a pair of the composite members is formed an electrolyte film. An anode is formed so as to cover the anode surface of the electrolyte film and an anode-side protrusion. The anode formed at the top of anode-side protrusion is stripped, forming a flat exposed surface on the top of the anode-side protrusion. A cathode is formed so as to cover the cathode surface of the electrolyte film and a cathode-side protrusion. The cathode formed on the top of the cathode-side protrusion is stripped using a spatula, a blade, etc., forming a flat exposed surface on the top of the cathode-side protrusion.

6 Claims, 17 Drawing Sheets

(51) Int. Cl.
  *H01M 8/0256*   (2016.01)
  *H01M 8/24*     (2016.01)
  *H01M 8/00*     (2016.01)
  *H01M 8/0273*   (2016.01)
  *H01M 8/1018*   (2016.01)

(52) U.S. Cl.
  CPC ....... *H01M 8/0256* (2013.01); *H01M 8/0273* (2013.01); *H01M 8/2405* (2013.01); *H01M 8/2418* (2016.02); *H01M 2008/1095* (2013.01); *Y02P 70/56* (2015.11)

(56) References Cited

U.S. PATENT DOCUMENTS

| | | | |
|---|---|---|---|
| 2010/0068562 A1 | 3/2010 | Fukushima et al. | |
| 2010/0248075 A1 | 9/2010 | Nowatari et al. | |
| 2011/0003229 A1* | 1/2011 | Schrooten | H01B 1/122 |
| | | | 429/457 |
| 2011/0195336 A1 | 8/2011 | Kabumoto et al. | |

FOREIGN PATENT DOCUMENTS

| | | |
|---|---|---|
| JP | 2005-085562 A | 3/2005 |
| JP | 2008-108677 A | 5/2008 |
| JP | 2008-258142 A | 10/2008 |
| JP | 2010-257943 A | 11/2010 |
| JP | 2011-165633 A | 8/2011 |
| WO | 2009/105896 A1 | 9/2009 |

* cited by examiner

Figure 7
(A) 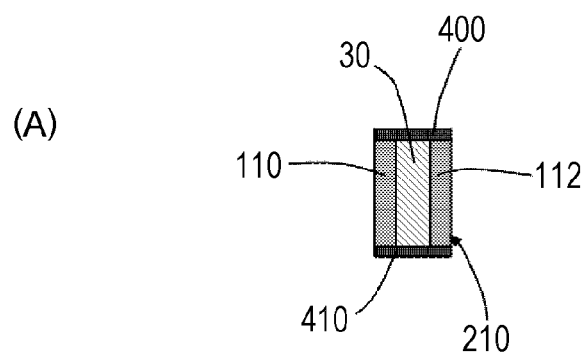
(B) 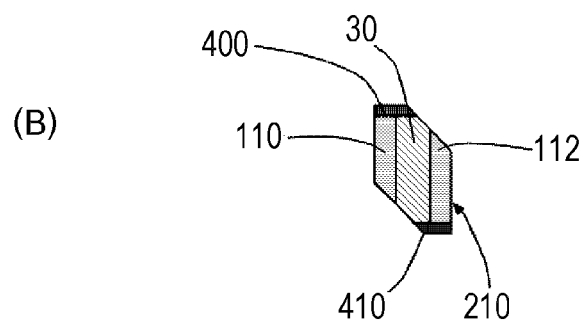

Figure 13
(A) 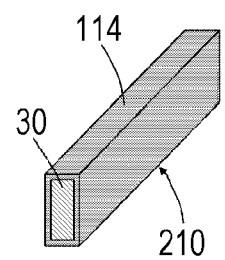
(B) 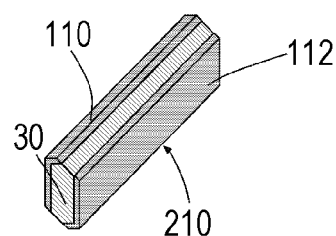

FUEL CELL AND METHOD FOR PRODUCING THE SAME

TECHNICAL FIELD

The present invention relates to fuel cell. In particular, it relates to a fuel CELL that includes cells in a flat arrangement.

BACKGROUND ART

A fuel CELL is a device configured to generate electrical energy from hydrogen and oxygen and achieves high power generation efficiency. The main features of fuel cell are as follows. Since electricity is directly generated without thermal or kinetic energy processes such as in the case of previous power generation methods, high power generation efficiency can be expected even from a small-scale plant. Moreover, fuel cell are environmentally friendly since they discharge less nitrogen compounds and the like and make less noise and vibration. In sum, fuel cell can effectively use the chemical energy of the fuel and offer environmental advantages. Thus, fuel cell are expected to become an energy supply system for the 21st century and are gathering much attention as a novel, prospective power generating system that can be used in various applications ranging from space use to automobile use and portable device use and from large-scale power generation to small-scale power generation. Technical development toward practical implementation is now in full swing.

In particular, polymer electrolyte fuel cell have low operating temperature compared to other types of fuel cell and feature high output densities. In recent years, polymer electrolyte fuel cell are expected to be used as power sources for portable devices (such as cellular phones, laptop personal computers, PDAs, MP3 players, digital cameras, electronic dictionaries, and electronic books). One example of polymer electrolyte fuel cell for potable devices is a flat arrangement-type fuel CELL that includes a number of single cells in a flat arrangement.

As the size of portable devices becomes smaller and the output density increasingly higher, there arises a growing need for high integration of cells of fuel cell for portable devices. In order to achieve higher integration of cells, the number of cells needs to be increased and the miniaturization of the cell structures and other structures such as interconnectors and gaps between the cells is needed. Because the cells are to be highly integrated, it becomes difficult to individually fabricate cells in producing a fuel CELL. Thus, currently, a technique of first forming an anode and a cathode that extend across electrolyte membranes of a plurality of sections and then removing specific regions of the anode and cathode by laser processing to form individual cells is now being implemented.

CITATION LIST

Patent Literature

PTL 1: International Publication No. 2009/105896 pamphlet
PTL 2: Japanese Published Unexamined Patent Application No. 2008-258142

SUMMARY OF INVENTION

Technical Problem

According to the cell fabrication technique that uses laser processing, the procedure takes a long time and thus there is a problem in that it takes longer and higher cost to fabricate fuel cell. Another problem is that alignment for laser processing is complicated. To be more specific, since the intervals between the cells are small (for example 0.3 mm), it becomes difficult to adjust the position of laser irradiation. Moreover, if the region to be irradiated with laser has fine irregularities, the laser becomes off-focus and the process accuracy may be degraded. In addition, ash resulting from selective removal of the anode and the cathode by laser irradiation acts as a contaminant and may adversely affect electrolyte membranes and catalyst layers.

The present invention has been made to address these problems and aims to provide a technique of fabricating integrated cells without using laser processing.

Solution to Problem

An embodiment of the present invention is a fuel CELL. The fuel CELL includes a plurality of membrane electrode assemblies in a flat arrangement, each membrane electrode assembly including an electrolyte membrane, an anode formed on one surface of the electrolyte membrane, and a cathode formed on another surface of the electrolyte membrane; a protruding portion disposed between the membrane electrode assemblies adjacent to each other and having a flat top surface, the protruding portion protruding from a surface of at least one electrode selected from the anode and cathode positioned in regions of main surfaces of the electrolyte membrane where the anode and the cathode are formed; an interconnector formed between the membrane electrode assemblies adjacent to each other so that, at a side surface of the protruding portion on the side of one of the membrane electrode assemblies, the interconnector contacts the electrode of that membrane electrode assembly; and an insulator that forms a part of the top surface and, in the protruding portion, electrically insulates between the interconnector and the electrode on the other membrane electrode assembly-side of the protruding portion. Here, "flat" also refers to a state in which fine irregularities that are visually identifiable are present on a surface.

In the fuel CELL of the embodiment described above, the interconnector may contact the electrode in a chamfered portion formed at a top of the protruding portion. In this case, the top surface of the protruding portion may be a multilayered surface in which an end surface of the electrode extending from one of the membrane electrode assemblies, an end surface of the interconnector, an end surface of the insulator, and an end surface of the electrode extending from the other membrane electrode assembly are stacked in that order. Furthermore, in a cross-section taken in a direction in which the membrane electrode assemblies are adjacent to each other, the chamfered portion may be receded from a line that connects both ends of the chamfered portion.

Another embodiment of the present invention is a fuel CELL. The fuel CELL includes a plurality of membrane electrode assemblies in a flat arrangement, each membrane electrode assembly including an electrolyte membrane, an anode formed on one surface of the electrolyte membrane, and a cathode formed on another surface of the electrolyte membrane; a protruding portion disposed between the membrane electrode assemblies adjacent to each other and having a flat top surface, the protruding portion protruding from a surface of at least one electrode selected from the anode and cathode positioned in regions of main surfaces of the electrolyte membrane where the anode and the cathode are formed; an interconnector formed between the membrane electrode assemblies adjacent to each other so that, at a side surface of the protruding portion on the side of one of the membrane electrode assemblies, the interconnector contacts the electrode of that membrane electrode assembly; an insulator that electrically insulates, in the protruding portion, between the interconnector and the electrode on the other membrane electrode assembly-side of the protruding portion; and an insulating coating layer that forms a part of the top surface and covers the interconnector and the insulator.

In the fuel CELL of this embodiment, the top surface of the protruding portion may be a multilayered surface in which an end surface of the electrode extending from one of the membrane electrode assemblies, the coating layer, and an end surface of the electrode extending from the other membrane electrode assembly are stacked in that order.

Yet another embodiment of the present invention is a method for producing a fuel CELL. The method for producing fuel CELL includes a step of preparing a composite material in which insulators are respectively stacked on both sides of an interconnector and the interconnector is exposed in a stacking direction in corner portions of a multilayered surface; a step of placing the composite material between electrolyte membranes of membrane electrode assemblies adjacent to each other so that the stacking direction intersects a surface direction of the electrolyte membranes and a protruding portion that protrudes from an electrode surface of the electrolyte membrane is formed; a step of forming an electrode on the protruding portion and the electrolyte membranes sandwiching the protruding portion; and a step of removing the electrode that covers a top of the protruding portion.

According to the method for producing a fuel CELL of the above-described embodiment, a composite film for a fuel CELL in which cells are integrated can be easily fabricated without using laser processing to form individual cells. Since laser processing is not employed to form individual cells, generation of ash resulting from laser irradiation is avoided. Accordingly, the electrolyte membranes and catalyst layers can be kept clean.

In the step of preparing the composite material of the method for producing a fuel CELL according to the above-described embodiment, after the insulators are stacked on both sides of the interconnector, the corner portions of the multilayered surface may be chamfered in a direction intersecting the multilayered surface. The composite material may include a coating layer that covers an end surface in a direction intersecting the stacking direction, and, in the step of removing the electrode, the electrode covering the top of the protruding portion and at least part of the coating layer may be removed.

Advantageous Effects of Invention

According to the present invention, integrated cells can be fabricated without using laser processing.

BRIEF DESCRIPTION OF DRAWINGS

FIG. 7 includes step diagrams illustrating a method for producing a composite film used in the fuel CELL of Embodiment 2.

FIG. 13 includes step diagrams illustrating a method for producing a composite film used in the fuel CELL of Embodiment 4.

DESCRIPTION OF EMBODIMENTS

Figure 1:
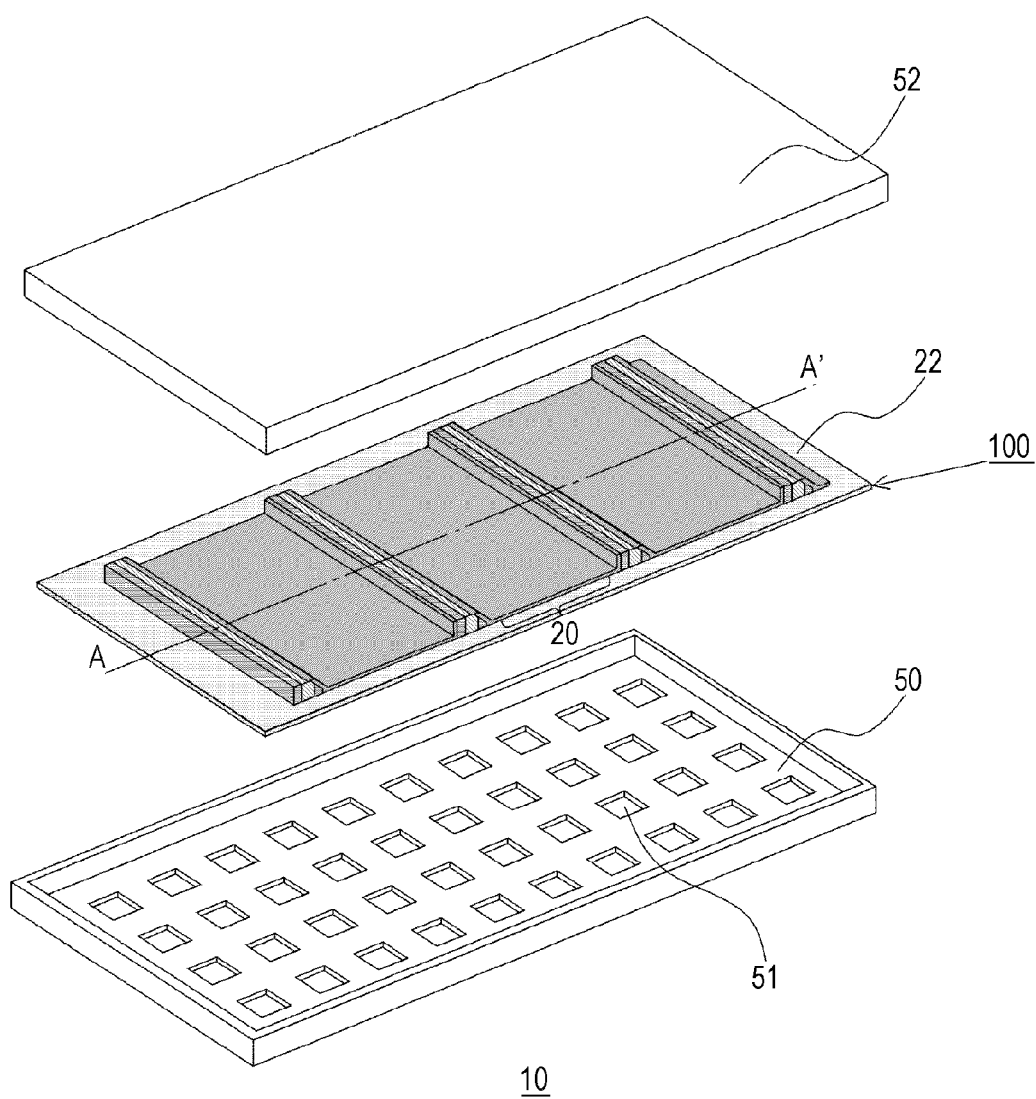
FIG. 1 is an exploded perspective view showing a structure of a fuel CELL according to Embodiment 1.

The embodiments of the present invention will now be described with reference to the drawings. In all drawings, identical or similar constitutional components are represented by the same reference characters and the descriptions therefor are omitted to avoid redundancy.

Embodiment 1

Figure 2:
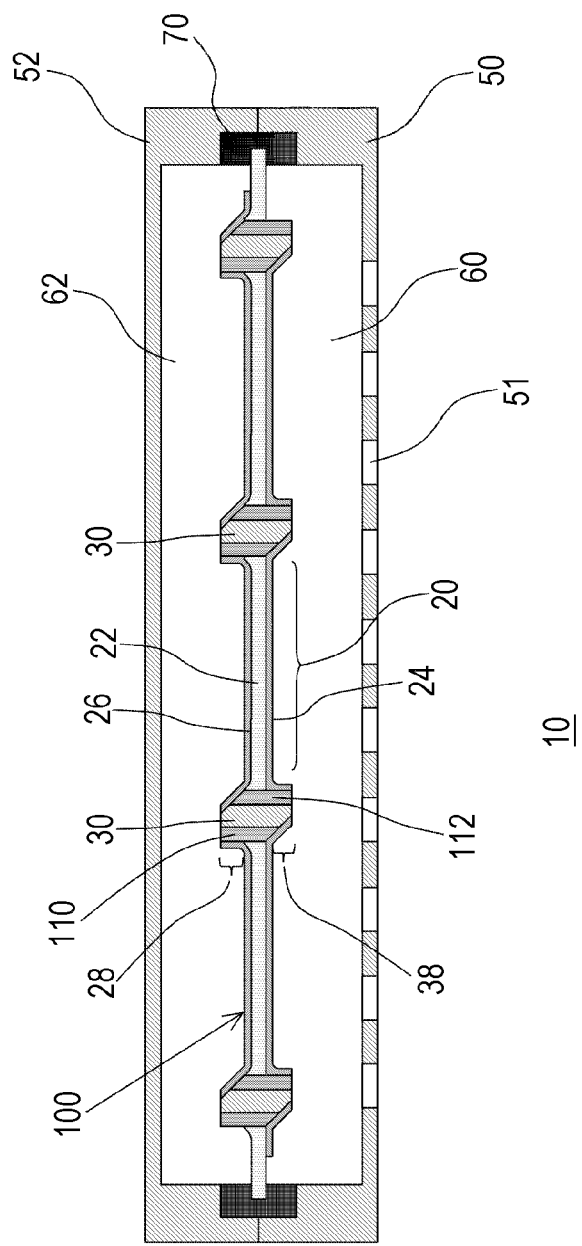
FIG. 2 is a cross-sectional view taken along line A-A' in FIG. 1.

FIG. 1 is an exploded perspective view showing a schematic structure of a fuel CELL according to Embodiment 1. FIG. 2 is a cross-sectional view taken along line A-A' in FIG. 1.

As shown in FIGS. 1 and 2, a fuel CELL 10 includes a composite film 100, a cathode housing 50, and an anode housing 52.

The composite film 100 includes a plurality of membrane electrode assemblies 20 in a flat arrangement. Each membrane electrode assembly 20 includes an electrolyte membrane 22, and a cathode 24 on a surface of the electrolyte membrane 22 and an anode 26. A rim of the composite film 100 is formed of the electrolyte membrane 22. The membrane electrode assemblies 20 are formed in a region on the inner side of the rim.

The electrolyte membrane 22 preferably exhibits good ion conductivity in a wet state or a humidified state and functions as an ion exchange membrane through which protons migrate between the cathode 24 and the anode 26. The electrolyte membrane 22 is formed of a solid polymer material such as a fluorine-containing polymer or a fluorine-free polymer. For example, a sulfonic acid-type perfluorocarbon polymer, a polysulfone resin, a perfluorocarbon polymer having a phosphonic acid group or a carboxylic acid group, or the like can be used. An example of the sulfonic acid-type perfluorocarbon polymer is Nafion (registered trademark, produced by DuPont) ionomer solution. Examples of the fluorine-free polymer include sulfonated aromatic polyether ether ketone and polysulfone. The thickness of the electrolyte membrane 22 is, for example, within the range of about 10 µm to about 200 µm.

The cathodes 24 are formed to be spaced from each other on one surface of the electrolyte membrane 22. Air that serves as an oxidizer may be supplied to the cathodes 24. The anodes 26 are formed to be spaced from each other on the other surface of the electrolyte membrane 22. Hydrogen that serves as a fuel gas may be supplied to the anodes 26. In this embodiment, hydrogen is used as a fuel gas. For example, any other suitable fuel, such as methanol, formic acid, butane, and other hydrogen carriers, can be used. A single cell is constituted by a cathode 24/anode 26 pair and the electrolyte membrane 22 sandwiched between the cathode 24 and the anode 26. Each single cell generates electric power through an electrochemical reaction between oxygen in air and a fuel (for example, hydrogen).

The cathode 24 and the anode 26 each include an ion exchange material and catalyst particles, and, in some cases, carbon particles. The ion exchange materials in the cathode 24 and the anode 26 may be used to improve the adhesiveness between the catalyst particles and the electrolyte membrane 22 and may play a role of transmitting protons between the two. The ion exchange materials may be formed of the same polymer material as that used in the electrolyte membrane 22. Examples of the catalyst metal include alloys of and single elements selected from Sc, Y, Ti, Zr, V, Nb, Fe, Co, Ni, Ru, Rh, Pd, Pt, Os, Ir, lanthanoid-series elements, and actinoid-series elements. In the case where the catalyst is to be supported, furnace black, acetylene black, ketjen black, carbon nanotubes, or the like may be used as the carbon particles. The cathode 24 and the anode 26 may each have a thickness of about 10 µm to about 40 µm. The cathode 24 and the anode 26 may each include a conductive layer through which the fuel gas or air can be diffused. In such a case, the cathode 24 and the anode 26 may each have a thickness of, for example, about 50 to about 500 µm.

As described above, in the fuel CELL 10 of this embodiment, a cathode 24 and an anode 26 that face each other with an electrolyte membrane 22 therebetween form a pair and a plurality of membrane electrode assemblies (single cells) 20 are formed in a flat arrangement.

An interconnector (conductive member) 30 is formed between adjacent membrane electrode assemblies 20. Examples of the material that provides the conductivity to the interconnector 30 include gas-impermeable carbon-based materials prepared by impregnating carbon fibers, a graphite sheet, a carbon paper, or carbon powder with resins, and metal materials such as platinum, gold, stainless steel, titanium, and nickel.

Figure 3:
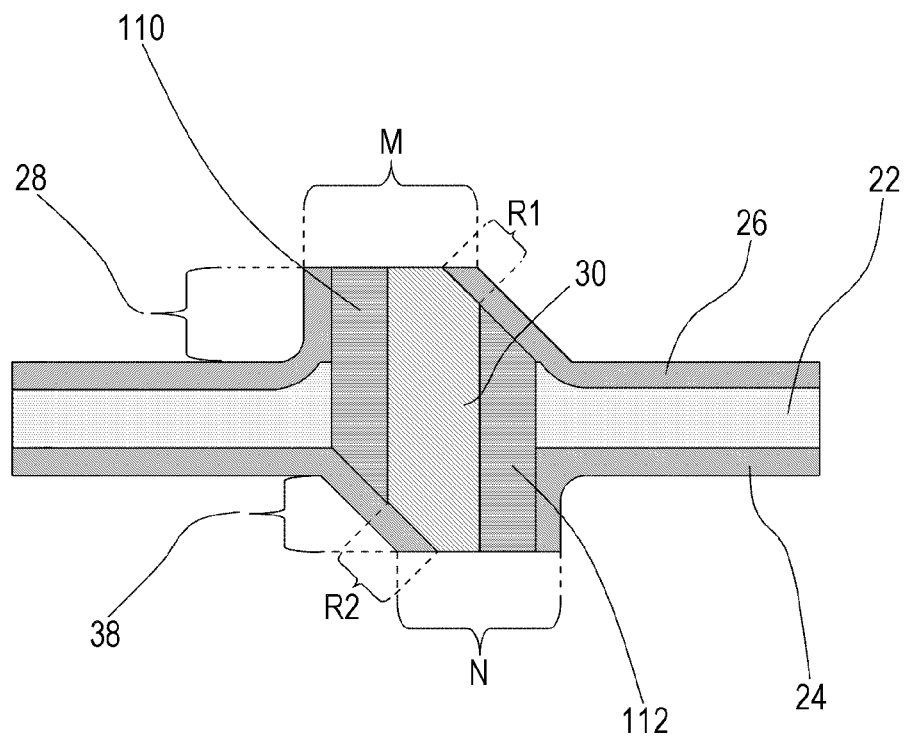
FIG. 3 is an enlarged view of a relevant part showing the structures of an anode-side protruding portion and a cathode-side protruding portion in Embodiment 1.

The interconnector 30 forms a part of an anode-side protruding portion 28 protruding from the surface of the anode 26. In the anode-side protruding portion 28, a part of the interconnector 30 has a region R1 exposed toward one membrane electrode assembly 20 (in FIG. 2, the membrane electrode assembly 20 on the right-hand side of the interconnector 30) of two membrane electrode assemblies 20 on two sides of the anode-side protruding portion 28 (refer to FIG. 3). In this region, the interconnector 30 makes contact with the anode 26 extending from the aforementioned one membrane electrode assembly 20. In the anode-side protruding portion 28, a first insulator 110 electrically insulates between the interconnector 30 and the anode 26 extending from the other membrane electrode assembly 20 (in FIG. 2, the membrane electrode assembly 20 on the left-hand side of the interconnector 30) of the two membrane electrode assemblies on two sides of the anode-side protruding portion 28.

The top surface M of the anode-side protruding portion 28 is flat. In this embodiment, the top surface M of the anode-side protruding portion 28 is a multilayered surface in which an end surface of the anode 26 extending from one of the membrane electrode assemblies 20, an end surface of the interconnector 30, an end surface of the first insulator 110, and an end surface of the anode 26 extending from the other membrane electrode assembly 20 are stacked in that order.

The interconnector 30 also forms a part of an anode-side protruding portion 28 that protrudes from the surface of the cathode 24. In the cathode-side protruding portion 38, a part of the interconnector 30 has a region R2 exposed toward the other membrane electrode assembly 20 of the two membrane electrode assemblies 20 on two sides of the cathode-side protruding portion 38 (refer to FIG. 3). In this region, the interconnector 30 makes contact with the cathode 24 extending from the aforementioned other membrane electrode assembly 20. In the cathode-side protruding portion 38, a second insulator 112 electrically insulates between the interconnector 30 and the cathode 24 extending from one of the membrane electrode assemblies 20 on the two sides of the cathode-side protruding portion 38.

The first insulator 110 and the second insulator 112 can be obtained by, for example, hot-pressing glass fibers impregnated with an epoxy resin.

The top surface N of the cathode-side protruding portion 38 is flat. In this embodiment, the top surface N of the cathode-side protruding portion 38 is a multilayered surface in which an end surface of the cathode 24 extending from the other membrane electrode assembly 20, an end surface of the interconnector 30, an end surface of the second insulator 112, and an end surface of the cathode 24 extending from the one membrane electrode assembly 20 are stacked in that order.

An interconnector 30 provided between membrane electrode assemblies 20 adjacent to each other electrically connects the anode 26 of one of the membrane electrode assemblies 20 that are adjacent to each other to the cathode 24 of the other membrane electrode assembly 20 of the membrane electrode assemblies 20 adjacent to each other. As a result, the membrane electrode assemblies (single cells) 20 adjacent to each other are serially connected and thus a plurality of membrane electrode assemblies 20 in a flat arrangement are serially connected to one another. In another embodiment, the anodes 26 and/or cathodes 24 may be connected to form a plurality of membrane electrode assemblies electrically connected in parallel or a plurality of membrane electrode assemblies in which serial connections and parallel connections are used in combination.

Referring again to FIG. 2, the cathode housing 50 may constitute a part of a casing of the fuel CELL 10 or may be adjacent to the cathodes 24. The cathode housing 50 may have air intakes 51 for taking in air from outside. An air chamber 60 in which air is distributed may be formed between the cathode housing 50 and the cathodes 24. The pressure of air in the air chamber 60 is equal to the atmospheric pressure.

The anode housing 52 may constitute a part of the casing of the fuel CELL 10 or may be adjacent to the anodes 26. A fuel gas chamber 62 for storing fuel may be formed between the anode housing 52 and the anodes 26. The anode housing 52 may have a fuel supply port (not shown in the drawing) through which a fuel gas can be replenished as necessary from a fuel cartridge or the like. The pressure of the fuel gas in the fuel gas chamber 62 may be retained at a level higher than the atmospheric pressure.

Examples of the material used in the cathode housing 50 and the anode housing 52 include common plastic resins such as phenolic resins, vinyl resins, polyethylene resins, polypropylene resins, polystyrene resins, urea resins, and fluororesins.

The cathode housing 50 and the anode housing 52 may be joined to each other through a gasket 70 formed in the peripheral portion of the composite film 100 by using a joining member (not shown in the drawing) such as a bolt, a nut, or the like. As a result, pressure is applied to the gasket 70 and the sealing property is enhanced due to the presence of the gasket 70.

(Method for Producing Fuel CELL According to Embodiment 1)

Figure 4:
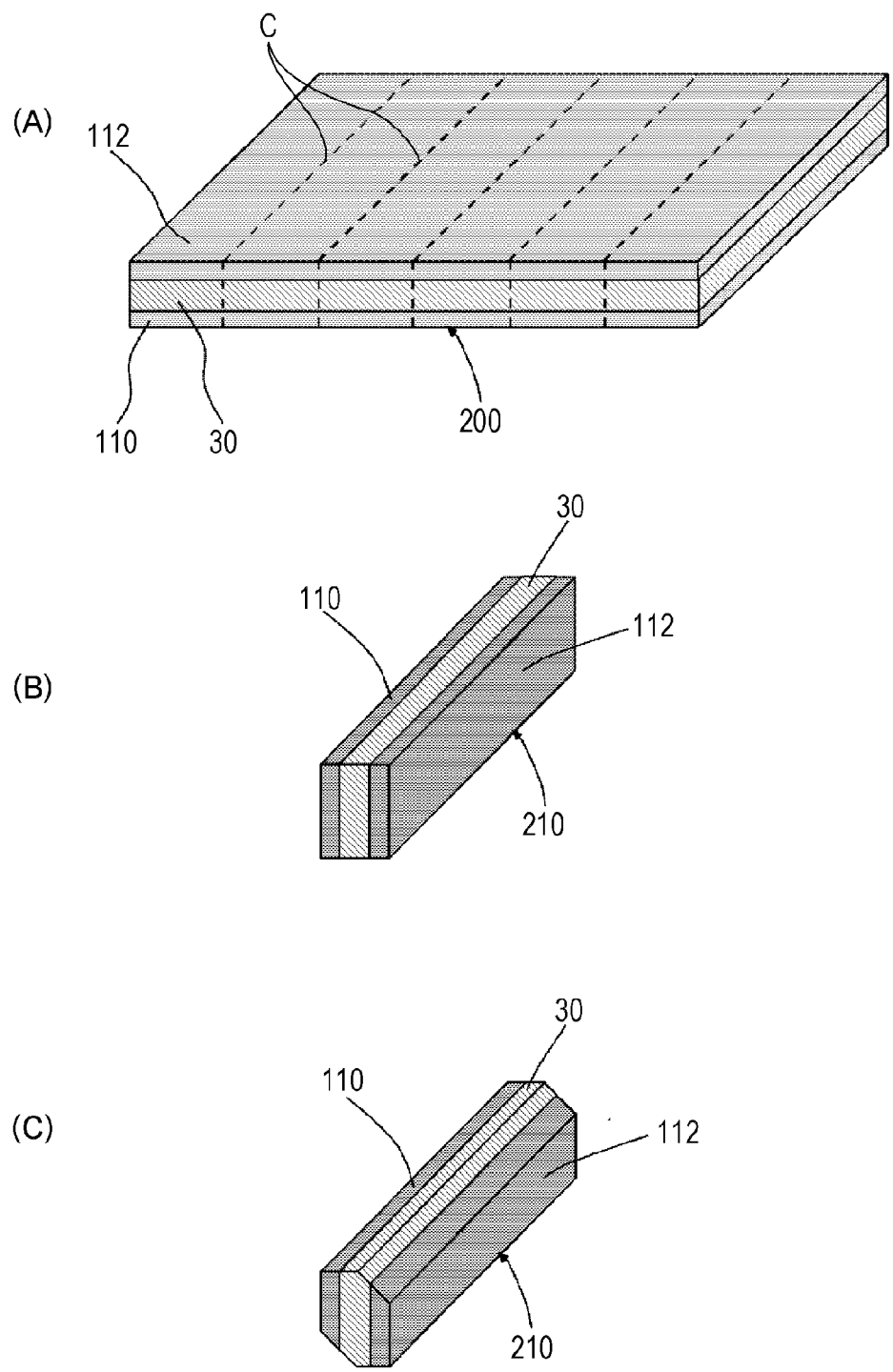
FIG. 4 includes step diagrams illustrating a method for producing a composite film used in the fuel CELL of Embodiment 1.
Figure 5:
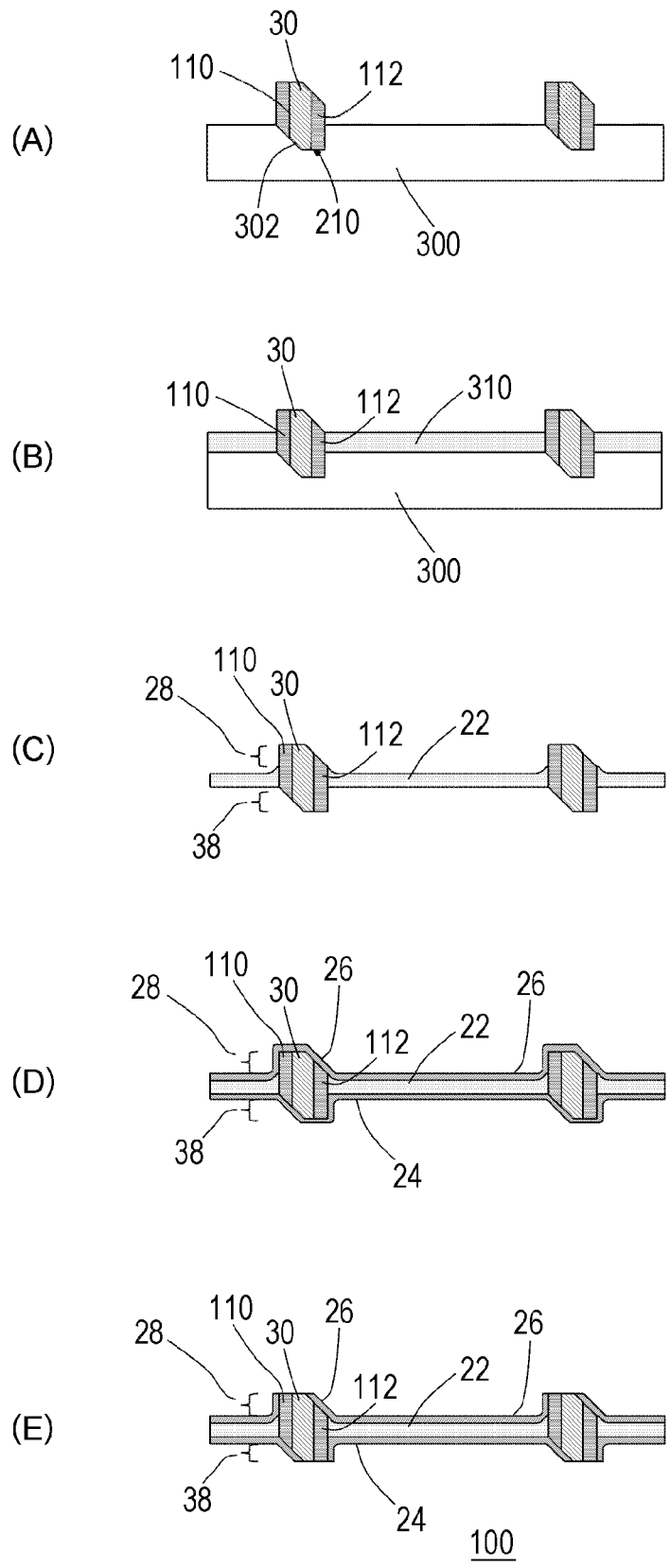
FIG. 5 includes step diagrams illustrating a method for producing a composite film used in the fuel CELL of Embodiment 1.

Of the method for producing a fuel CELL according to Embodiment 1, a method for fabricating a composite film 100 is described in particular with reference to FIGS. 4 to 5.

First, as shown in FIG. 4(A), a laminate 200 in which a first insulator 110 and a second insulator 112 are respectively stacked on two sides of an interconnector 30 is prepared. The first insulator 110 and the second insulator 112 each have a thickness of, for example, 0.1 mm. Then the laminate 200 is cut along cutting lines C that are spaced from one another at predetermined intervals so as to form individual rod-shaped composite materials 210 (see FIG. 4(B)). The intervals of the cutting lines C may be any as long as each interval is larger than the total thickness of the electrolyte membrane 22, the cathode 24, and the anode 26, and are, for example, about 50 to about 1400 μm.

Next, as shown in FIG. 4(C), a region that includes one corner portion of the second insulator 112 is chamfered along the longitudinal direction (direction intersecting the multilayered surface) of the rod-shaped composite material 210 so as to expose the interconnector 30. Similarly, a region that includes an opposite corner portion of the first insulator 110 which is positioned diagonally across the aforementioned corner portion of the second insulator 112 in a cross-section that intersects the longitudinal direction of the composite material 210 is chamfered to expose the interconnector 30.

Next, as shown in FIG. 5(A), the composite materials 210 are placed on a base 300 such as a glass plate so that the layer stacking direction in the composite material 210 is coincident with the surface direction of the base 300. Grooves 302 into which a part of the composite material 210 can be fit are formed in the base 300 in advance at particular intervals. Thus, the process for alignment needed in placing the composite materials on the base can be omitted.

Next, as shown in FIG. 5(B), an electrolyte solution 310 that contains an ion exchange material such as Nafion is applied between a pair of the composite materials 210.

Then, as shown in FIG. 5(C), the electrolyte solution is dried to form an electrolyte membrane 22. As the solvent is removed, the thickness of the electrolyte membrane 22 becomes smaller than the thickness of the electrolyte solution 310 shown in FIG. 5(B). A part of the composite material 210 protruding from a surface (hereinafter this surface is referred to as an anode surface) of the electrolyte membrane 22 forms a part of the anode-side protruding portion 28 described above. A part of the composite material 210 protruding from the other surface (hereinafter this surface is referred to as a cathode surface) of the electrolyte membrane 22 forms a part of the cathode-side protruding portion 38.

Next, as shown in FIG. 5(D), an anode catalyst slurry is applied to the anode surface of the electrolyte membrane 22 and the anode-side protruding portion 28 by a spray coating method to form an anode 26. During this process, the interconnector 30 exposed in the chamfered portion of the anode-side protruding portion 28 connects to the anode 26. A cathode catalyst slurry is applied to the cathode surface of the electrolyte membrane 22 and the cathode-side protruding portion 38 by a spray coating method so as to form a cathode 24. During this process, the interconnector 30 exposed in the chamfered portion of the cathode-side protruding portion 38 connects to the cathode 24.

Next, as shown in FIG. 5(E), the anode 26 formed at the top of the anode-side protruding portion 28 is removed by using a spatula, a blade, or the like so as to form a flat exposed surface at the top of the anode-side protruding portion 28. In this step, the anodes 26 formed on the tops of a plurality of anode-side protruding portions 28 are removed simultaneously so as to simplify the process. In an exposed surface formed by removal of the anode 26, an end surface (cut surface) of the first insulator 110 is interposed between an end surface (cut surface) of the anode 26 extending from above the electrolyte membrane 22 on the side opposite to the chamfered side and an end surface (cut surface) of the interconnector 30. As a result, the interconnector 30 is electrically insulated from the anode 26 extending from above the electrolyte membrane 22 on the side opposite to the chamfered side.

Similarly, the cathode 24 at the top of the cathode-side protruding portion 38 is removed by using a spatula, a blade, or the like so as to form a flat exposed surface at the top of the cathode-side protruding portion 38. In this exposed surface, an end surface (cut surface) of the second insulator 112 is interposed between an end surface (cut surface) of the cathode 24 extending from above the electrolyte membrane 22 on the side opposite to the chamfered side and an end surface (cut surface) of the interconnector 30. As a result, the interconnector 30 is electrically insulated from the cathode 24 that extends from above the electrolyte membrane 22 on the side opposite to the chamfered side.

A composite film 100 used in the fuel CELL of Embodiment 1 is fabricated through the above-described steps.

Embodiment 2

Figure 6:
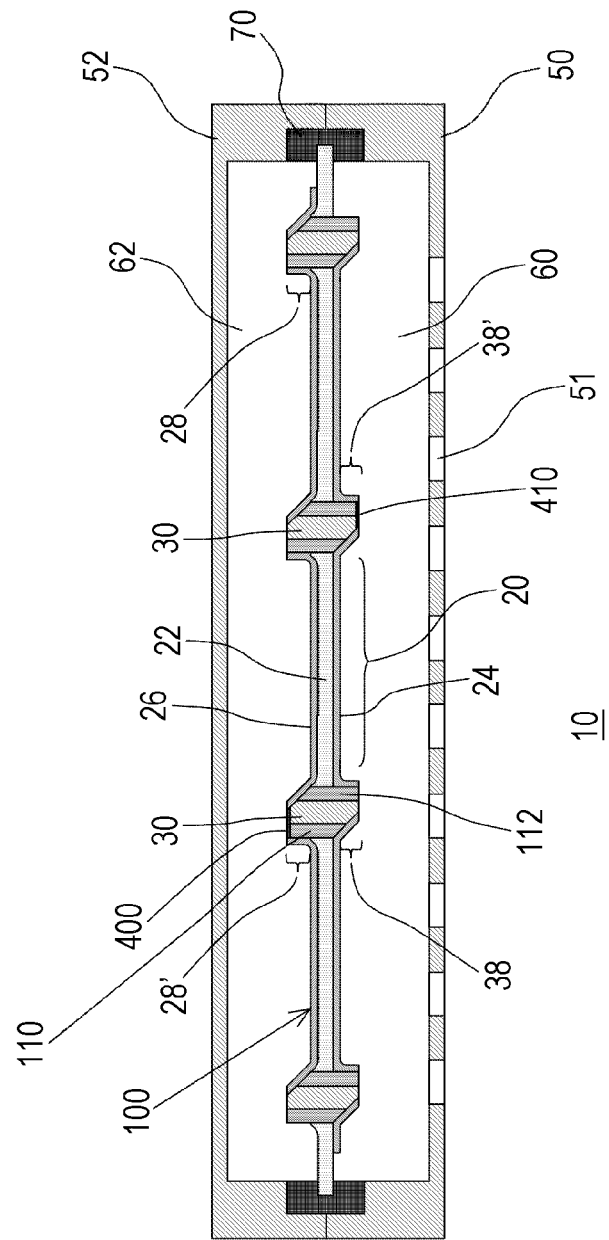
FIG. 6 is a cross-sectional view showing a structure of a fuel CELL according to Embodiment 2.

FIG. 6 is a cross-sectional view showing a structure of a fuel CELL according to Embodiment 2. The basic structure of the fuel CELL 10 of this embodiment is the same as that of Embodiment 1 and descriptions for the features similar to Embodiment 1 are omitted to avoid redundancy.

In this embodiment, some anode-side protruding portions 28' among the anode-side protruding portions 28 each have a flat top surface that has a multilayered structure in which a coating layer 400 is interposed between an end surface of the anode 26 that extends from above the electrolyte membrane 22 on the chamfered side and an end surface of the anode 26 that extends from above the electrolyte membrane 22 on the side opposite to the chamfered side. Alternatively, all of the anode-side protruding portions may have the structure of the anode-side protruding portion 28'.

In this embodiment, some cathode-side protruding portions 38' among the cathode-side protruding portions 38 each have a flat top surface that has a multilayered structure in which a coating layer 410 is interposed between an end surface of the cathode 24 that extends from above the electrolyte membrane 22 on the chamfered side and an end surface of the cathode 24 that extends from above the electrolyte membrane 22 on the side opposite to the chamfered side. Alternatively, all of the cathode-side protruding portions may have the structure of the cathode-side protruding portion 38'.

The coating layer 400 and the coating layer 410 are formed of an insulating material. The coating layer 400 and the coating layer 410 are preferably softer and more easily removable with a spatula or the like than the interconnector 30. The coating layer 400 and the coating layer 410 preferably have good adhesiveness to the interconnector 30 and do not adversely affect the electrolyte membrane 22 and the catalyst layers. An example of the material used for forming the coating layer 400 and the coating layer 410 is Nafion.

(Method for Producing Fuel CELL According to Embodiment 2)

Figure 8:
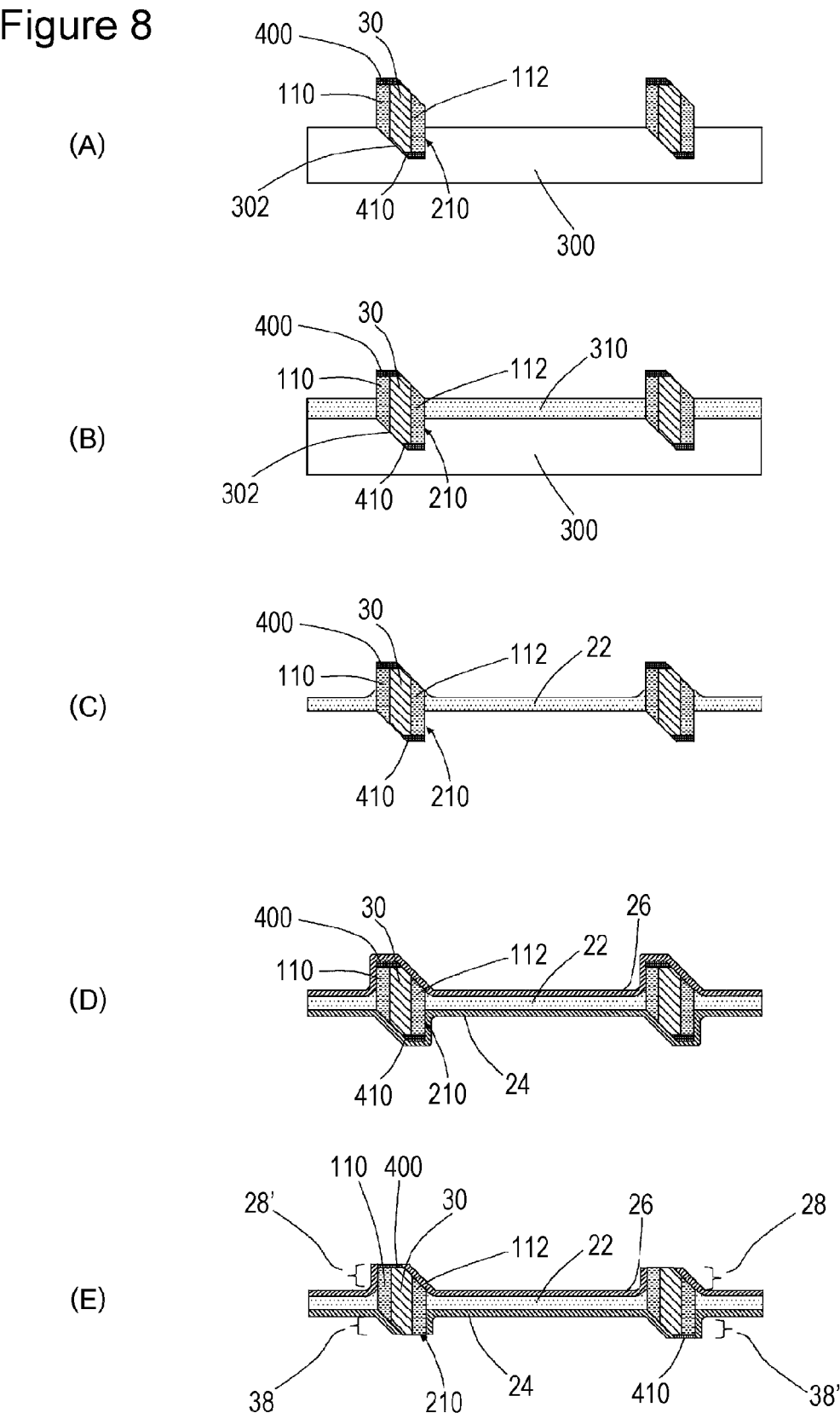
FIG. 8 includes step diagrams illustrating a method for producing a composite film used in the fuel CELL of Embodiment 2.

Of the method for producing a fuel CELL according to Embodiment 2, a method for fabricating a composite film 100 is described in particular with reference to FIGS. 7 to 8.

As shown in FIG. 7(A), a coating layer 400 and a coating layer 410 are respectively formed on two multilayered surfaces of the composite material 210 shown in FIG. 4(B).

Next, as shown in FIG. 7(B), a region that includes a corner portion of the second insulator 112 and an end portion of the coating layer 400 near the corner portion is chamfered along the longitudinal direction (direction intersecting the multilayered surface) to expose the interconnector 30. Similarly, in a cross-section intersecting the longitudinal direction of the composite membrane 210, a region that includes an opposite corner portion of the first insulator 110 which is positioned diagonally across the aforementioned corner portion of the second insulator 112 and an end portion of the coating layer 410 near the opposite corner portion is chamfered along the longitudinal direction of the composite material 210 to expose the interconnector 30.

Next, as shown in FIG. 8(A), the composite materials 210 are placed on a base 300 such as a glass plate so that the layer stacking direction in the composite material 210 is coincident with the surface direction of the base 300 while fitting parts of the composite materials 210 in the grooves 302.

Next, as shown in FIG. 8(B), the electrolyte solution 310 containing an ion exchange material such as Nafion is applied between a pair of the composite materials 210.

Next, as shown in FIG. 8(C), the electrolyte solution is dried to form an electrolyte membrane 22. As the solvent is removed, the thickness of the electrolyte membrane 22 becomes smaller than the thickness of the electrolyte solution 310 shown in FIG. 8(B). A part of the composite material 210 protruding from the anode surface of the electrolyte membrane 22 forms a part of the anode-side protruding portion 28. A part of the composite material 210 protruding from the cathode surface of the electrolyte membrane 22 forms a part of the cathode-side protruding portion 38.

Next, as shown in FIG. 8(D), an anode catalyst slurry is applied to the anode surface of the electrolyte membrane 22, the anode-side protruding portion 28, and the coating layer 400 by a spray coating method so as to form the anode 26. During this process, the interconnector 30 exposed in the chamfered portion of the anode-side protruding portion 28 connects to the anode 26. A cathode catalyst slurry is applied to the cathode surface of the electrolyte membrane 22, the coating layer 410, and the cathode-side protruding portion 38 by a spray coating method so as to form the cathode 24. During this process, the interconnector 30 exposed in the chamfered portion of the cathode-side protruding portion 38 connects to the cathode 24.

Next, as shown in FIG. 8(E), the anode 26 and the coating layer 400 formed at the top of the anode-side protruding portion 28 are removed by using a spatula, a blade, or the like so as to form a flat exposed surface at the top of the anode-side protruding portion 28. If all of the coating layer 400 is removed, an anode-side protruding portion 28 identical to that in Embodiment 1 is formed. If a part of the coating layer 400 is left unremoved, the anode-side protruding portion 28' is formed.

Similarly, the cathode 24 and the coating layer 410 formed at the top of the cathode-side protruding portion 38 are removed by using a spatula, a blade, or the like to form a flat exposed surface at the top of the cathode-side protruding portion 38. If all of the coating layer 410 is removed, a cathode-side protruding portion 38 identical to that in Embodiment 1 is formed. If a part of the coating layer 410 is left unremoved, the cathode-side protruding portion 38' is formed.

A composite film 100 used in the fuel CELL of Embodiment 2 is fabricated through the above-described steps.

Embodiment 3

Figure 9:
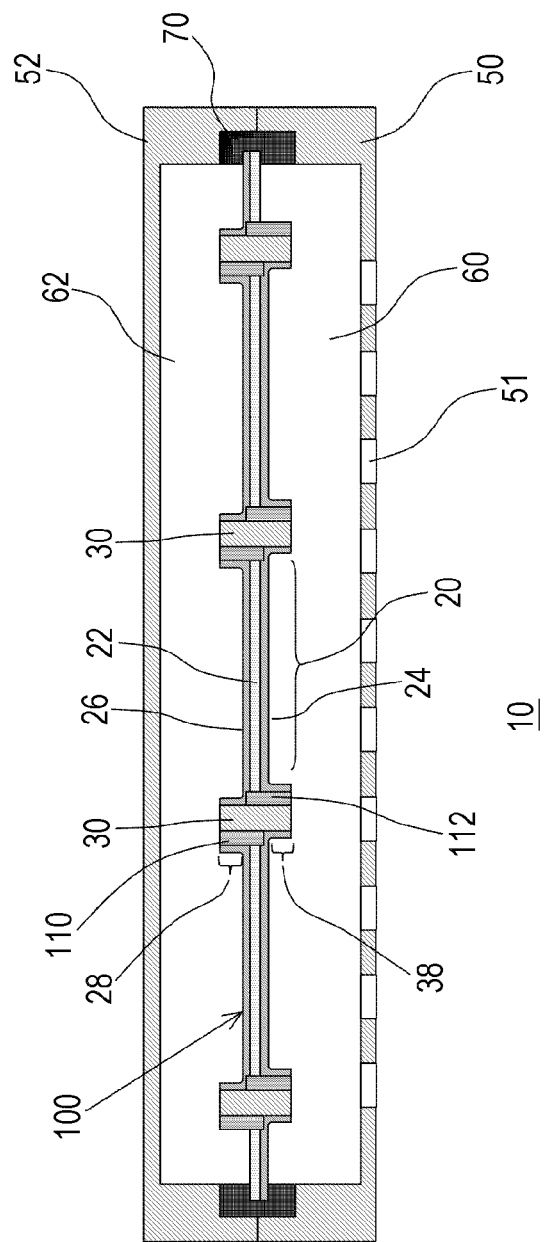
FIG. 9 is a cross-sectional view showing a structure of a fuel CELL according to Embodiment 3.

FIG. 9 is a cross-sectional view showing a structure of a fuel CELL according to Embodiment 3. The basic structure of the fuel CELL 10 of this embodiment is the same as that of Embodiment 1 and descriptions for the features similar to Embodiment 1 are omitted to avoid redundancy.

In this embodiment, the flat top surface of the anode-side protruding portion 28 has a multilayered structure in which an end surface of the interconnector 30 and the first insulator 110 are interposed between an end surface of the anode 26 extending from above the electrolyte membrane 22 on one side of the interconnector 30 and an end surface of the anode 26 extending from above the electrolyte membrane 22 on the other side of the interconnector 30.

In the interconnector 30 in the anode-side protruding portion 28, a side surface on the side of the electrolyte membrane 22 located on one side of the interconnector 30 is not covered with the second insulator 112. The interconnector 30 is electrically connected to the anode 26 that extends from above the electrolyte membrane 22 located on one side of the interconnector 30. In the anode-side protruding portion 28, the interconnector 30 is electrically insulated by the first insulator 110 from the anode 26 that extends from above the electrolyte membrane 22 located on the other side of the interconnector 30.

The flat top surface of the cathode-side protruding portion 38 has a multilayered structure in which an end surface of the interconnector 30 and the second insulator 112 are sandwiched between an end surface of the cathode 24 extending from above the electrolyte membrane 22 located on the other side of the interconnector 30 and an end surface of the cathode 24 extending from above the electrolyte membrane 22 on one side of the interconnector 30.

In the interconnector 30 in the cathode-side protruding portion 38, a side surface on the side of the electrolyte membrane 22 located on the other side of the interconnector 30 is not covered with the first insulator 110. The interconnector 30 electrically connects to the cathode 24 extending from above the electrolyte membrane 22 on the other side of the interconnector 30. In the cathode-side protruding portion 38, the interconnector 30 is electrically insulated by the second insulator 112 from the cathode 24 extending from above the electrolyte membrane 22 located on one side of the interconnector 30. Note that in Embodiment 3, the coating layer 400 and the coating layer 410 may be formed as in Embodiment 2.

(Method for Producing a Fuel CELL According to Embodiment 3)

Figure 10:
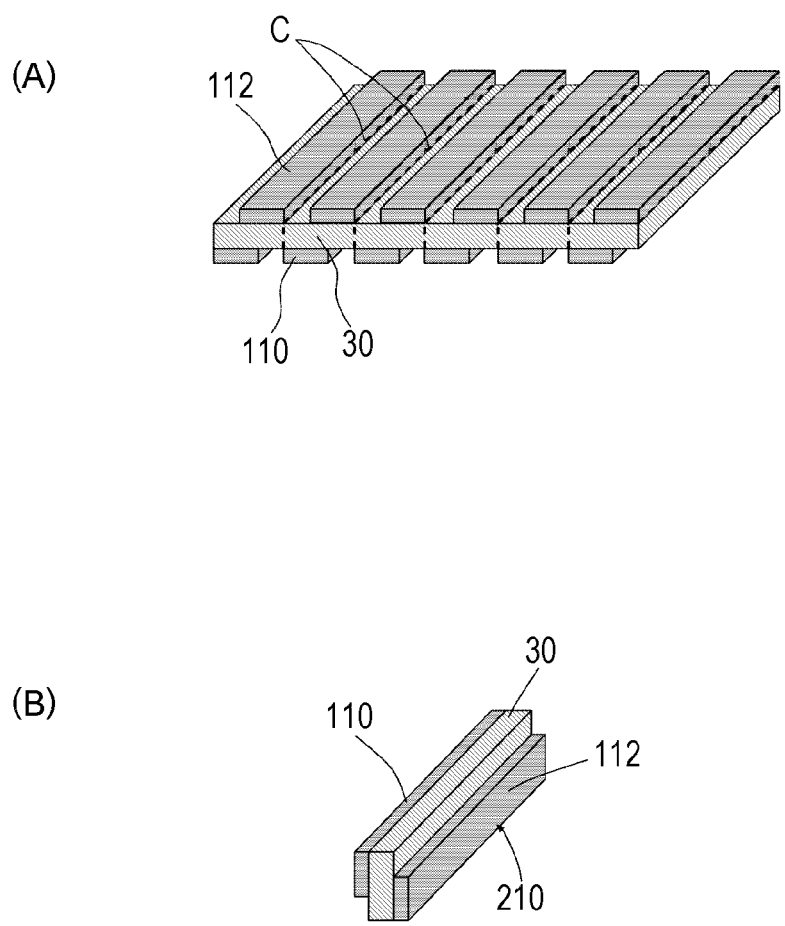
FIG. 10 includes step diagrams illustrating a method for producing a composite film used in the fuel CELL of Embodiment 3.
Figure 11:
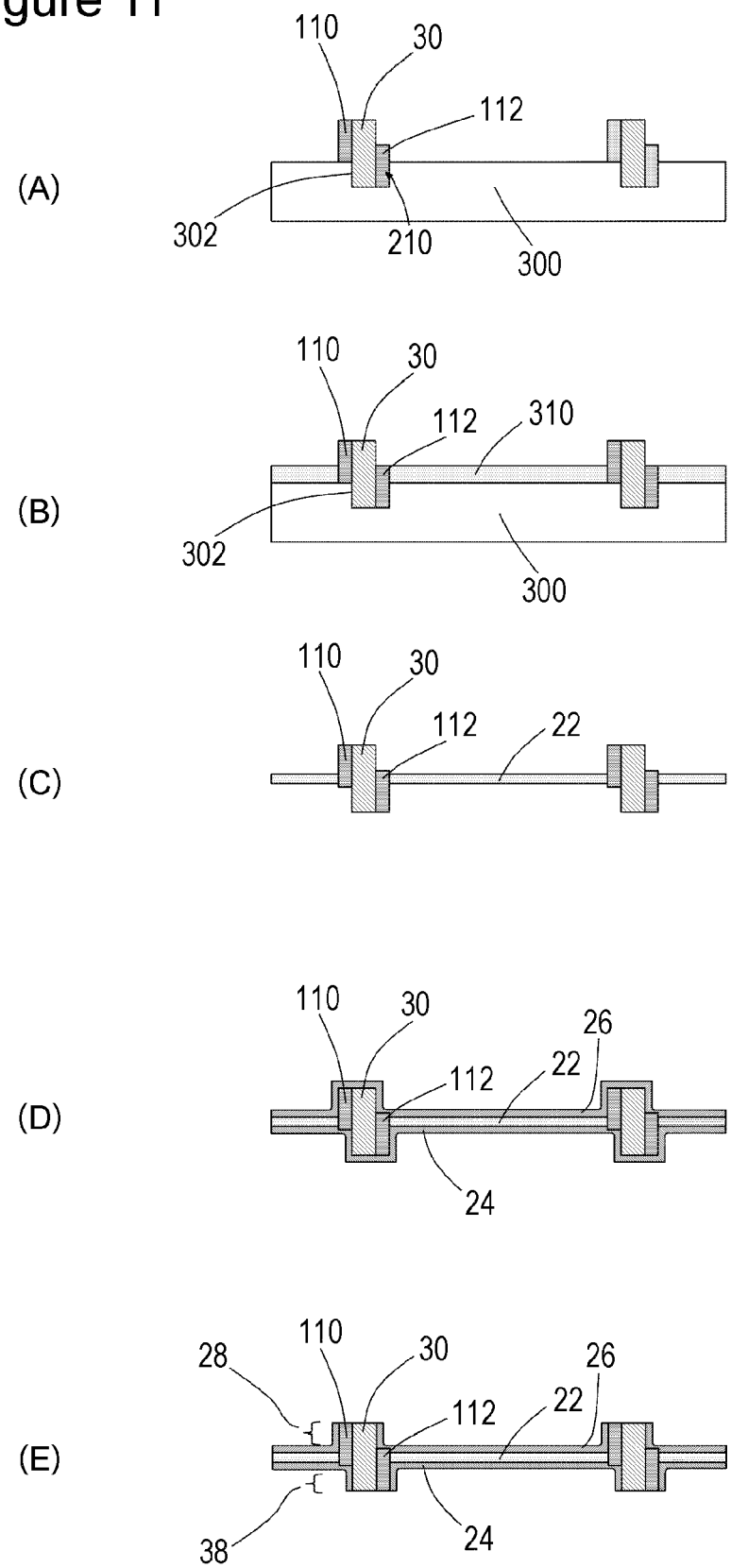
FIG. 11 includes step diagrams illustrating a method for producing a composite film used in the fuel CELL of Embodiment 3.

Of the method for producing a fuel CELL according to Embodiment 3, a method for fabricating a composite film 100 is described in particular with reference to FIGS. 10 to 11.

As shown in FIG. 10(A), a laminate 200 in which the first insulator 110 and the second insulator 112 sandwiching the interconnector 30 in a region defined by cutting lines C are staggered in the surface direction of the interconnector 30 is prepared. On one side of the interconnector 30 defined by a pair of the cutting lines C, the interconnector 30 is exposed by a particular length from one of the cutting lines C in the direction intersecting this cutting line C. On the other side of the interconnector 30, the interconnector 30 is exposed by a particular length from the other cutting line C in the direction intersecting this cutting line C.

The laminate 200 is cut along the cutting lines C to form individual rod-shaped composite materials 210 (refer to FIG. 10(B)).

Next, as shown in FIG. 11(A), the composite materials 210 are placed on a based 300 such as a glass plate so that the layer stacking direction in the composite material 210 is coincident with the surface direction of the base 300 and that a part of each composite material 210 is fitted into a groove 302.

Then as shown in FIG. 11(B), an electrolyte solution 310 containing an ion exchange material such as Nafion is applied between a pair of the composite materials 210.

Then as shown in FIG. 11(C), the electrolyte solution is dried to form an electrolyte membrane 22. As the solvent is removed, the thickness of the electrolyte membrane 22 becomes smaller than the thickness of the electrolyte solution 310 shown in FIG. 11(B). A part of the composite material 210 protruding from the anode surface of the electrolyte membrane 22 forms a part of the anode-side protruding portion 28. A part of the composite material 210 protruding from the cathode surface of the electrolyte membrane 22 forms a part of the cathode-side protruding portion 38.

Next, as shown in FIG. 11(D), an anode catalyst slurry is applied to the anode surface of the electrolyte membrane 22 and the anode-side protruding portion 28 by a spray coating method to form an anode 26. During this process, the interconnector 30 exposed in one of the side surfaces of the anode-side protruding portion 28 connects to the anode 26. A cathode catalyst slurry is applied to the cathode surface of the electrolyte membrane 22 and the cathode-side protruding portion 38 by a spray coating method so as to form a cathode 24. During this process, the interconnector 30 exposed in the other side surface of the cathode-side protruding portion 38 connects to the cathode 24.

Next, as shown in FIG. 11(E), the anode 26 formed at the top of the anode-side protruding portion 28 is removed by using a spatula, a blade, or the like so as to form a flat exposed surface at the top of the anode-side protruding portion 28. Similarly, the cathode 24 at the top of the cathode-side protruding portion 38 is removed by using a spatula, a blade, or the like so as to form a flat exposed surface at the top of the cathode-side protruding portion 38.

A composite film 100 used in the fuel CELL of Embodiment 3 is fabricated through the above-described steps.

Embodiment 4

Figure 12:
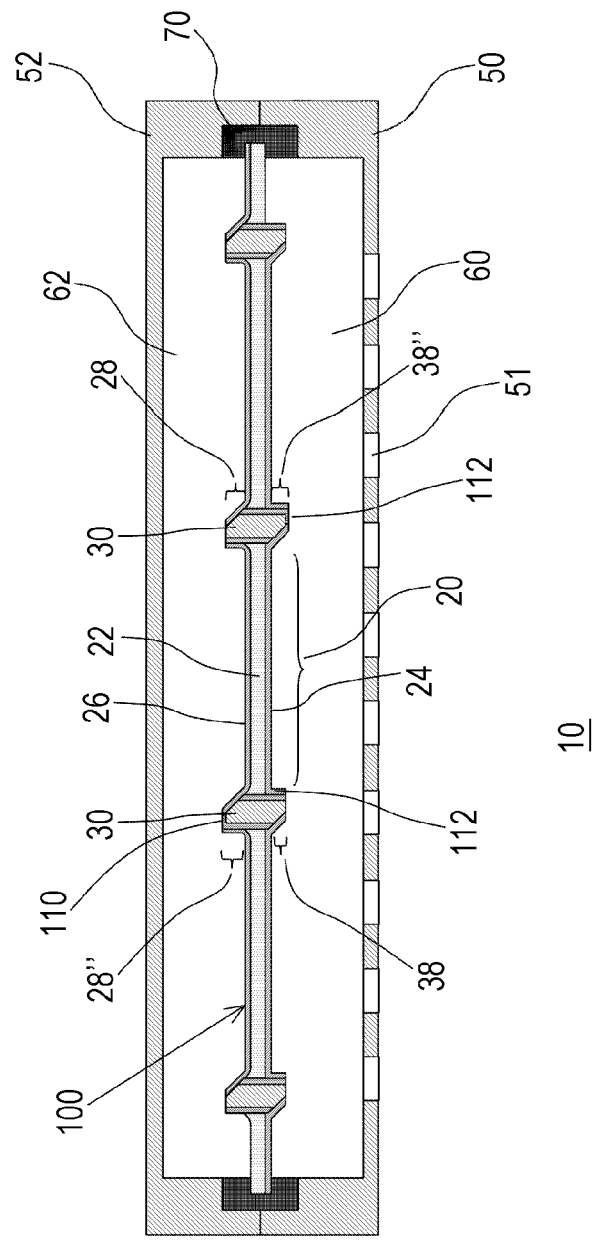
FIG. 12 is a cross-sectional view showing a structure of a fuel CELL according to Embodiment 4.

FIG. 12 is a cross-sectional view showing a structure of a fuel CELL according to Embodiment 4. The basic structure of the fuel CELL 10 of this embodiment is the same as that of Embodiment 1 and descriptions for the features similar to Embodiment 1 are omitted to avoid redundancy.

In this embodiment, some of the anode-side protruding portions 28 are anode-side protruding portions 28" that each have a flat top surface having a multilayered structure in which the first insulator 110 is interposed between an end surface of the anode 26 extending from above the chamfered-side electrolyte membrane 22 and an end surface of the anode 26 extending from above the electrolyte membrane 22 on the side opposite to the chamfered side. Alternatively, all of the anode-side protruding portions may have the structure of the anode-side protruding portion 28".

In the anode-side protruding portion 28', the first insulator 110 is formed on the flat top surface and a side surface of the interconnector 30 on the side opposite to the chamfered side. The first insulator 110 electrically insulates between the interconnector 30 and the anode 26 on the side opposite to the chamfered side.

In this embodiment, some of the cathode-side protruding portions 38 are cathode-side protruding portions 38" that each have a flat top surface having a multilayered structure in which the second insulator 112 is interposed between an end surface of the cathode 24 extending from above the chamfered-side electrolyte membrane 22 and an end surface of the cathode 24 extending from above the electrolyte membrane 22 on the side opposite to the chamfered side. Alternatively, all of the cathode-side protruding portions may have the structure of the cathode-side protruding portion 38".

In the cathode-side protruding portion 38', the second insulator 112 is formed on the flat top surface and a side surface of the interconnector 30 on the side opposite to the chamfered side. The second insulator 112 electrically insulates between the interconnector 30 and the cathode 24 on the side opposite to the chamfered side.

(Method for Producing a Fuel CELL According to Embodiment 4)

Figure 14:
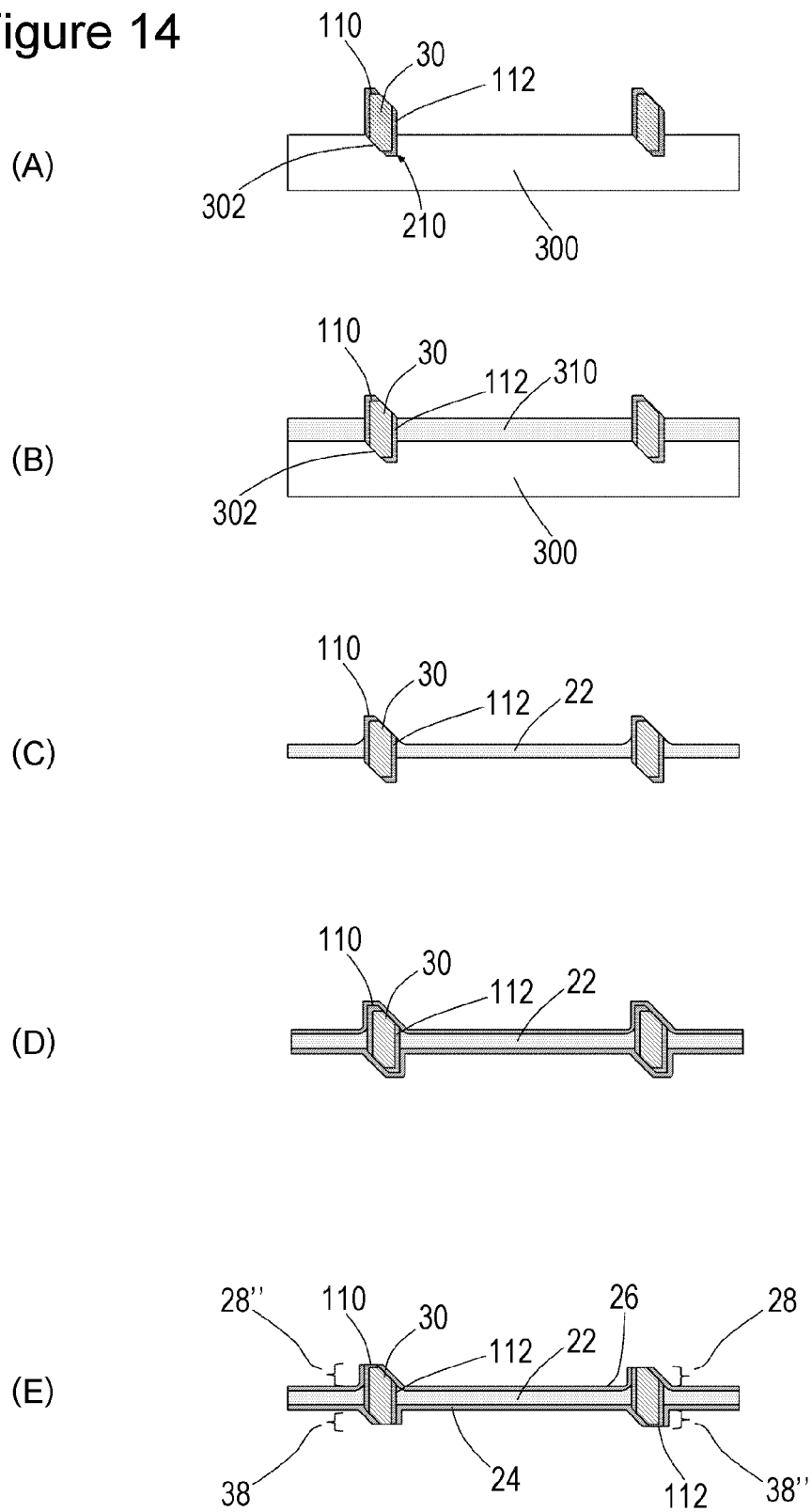
FIG. 14 includes step diagrams illustrating a method for producing a composite film used in the fuel CELL of Embodiment 4.

Of the method for producing a fuel CELL according to Embodiment 4, a method for fabricating a composite film 100 is described in particular with reference to FIGS. 13 to 14.

As shown in FIG. 13(A), a composite material 210 that includes a rod-shaped interconnector 30 and an insulator 114 that covers the periphery of the interconnector 30 is prepared.

Next, as shown in FIG. 13(B), a pair of corner portions that are diagonally across from each other in a cross-section intersecting the longitudinal direction of the composite material 210 are chamfered along the longitudinal direction of the composite material 210 so as to expose the interconnector 30. As a result, a first insulator 110 and a second insulator 112 separated from the first insulator 110 are formed.

Next, as shown in FIG. 14(A), the composite materials 210 are placed on a base 300 by fitting a part of each composite material 210 into a groove 302 so that the direction in which the first insulator 110, the interconnector 30, and the second insulator 112 are stacked is coincident with the surface direction of the base 300.

Next, as shown in FIG. 14(B), an electrolyte solution 310 containing an ion exchange material such as Nafion is applied between a pair of the composite materials 210.

Then as shown in FIG. 14(C), the electrolyte solution is dried to form an electrolyte membrane 22. As the solvent is removed, the thickness of the electrolyte membrane 22 becomes smaller than the thickness of the electrolyte solution 310 shown in FIG. 14(B). A part of the composite material 210 protruding from the anode surface of the electrolyte membrane 22 forms a part of the anode-side protruding portion 28. A part of the composite material 210 protruding from the cathode surface of the electrolyte membrane 22 forms a part of the cathode-side protruding portion 38.

Next, as shown in FIG. 14(D), an anode catalyst slurry is applied to the anode surface of the electrolyte membrane 22 and the anode-side protruding portion 28 by a spray coating method to form an anode 26. During this process, the interconnector 30 exposed in one of the side surfaces of the anode-side protruding portion 28 connects to the anode 26. A cathode catalyst slurry is applied to the cathode surface of the electrolyte membrane 22 and the cathode-side protruding portion 38 by a spray coating method so as to form a cathode 24. During this process, the interconnector 30 exposed in the other side surface of the cathode-side protruding portion 38 connects to the cathode 24.

Next, as shown in FIG. 14(E), the anode 26 formed at the top of the anode-side protruding portion 28 is removed by using a spatula, a blade, or the like so as to form a flat exposed surface at the top of the anode-side protruding portion 28. If all of the first insulator 110 is removed, an anode-side protruding portion 28 identical to that in Embodiment 1 is formed. If a part of the first insulator 110 on the top surface of the anode-side protruding portion 28 is left unremoved, the anode-side protruding portion 28" is formed.

Similarly, the cathode 24 at the top of the cathode-side protruding portion 38 is removed by using a spatula, a blade, or the like so as to form a flat exposed surface at the top of the cathode-side protruding portion 38. If all of the second insulator 112 constituting the top surface of the cathode-side protruding portion 38 is removed, a cathode-side protruding portion 38 identical to that in Embodiment 1 is formed. If a part of the second insulator 112 constituting the top surface of the cathode-side protruding portion 38 is left unremoved, the cathode-side protruding portion 38" is formed.

A composite film 100 used in the fuel CELL of Embodiment 4 is fabricated through the above-described steps.

Embodiment 5

Figure 15:
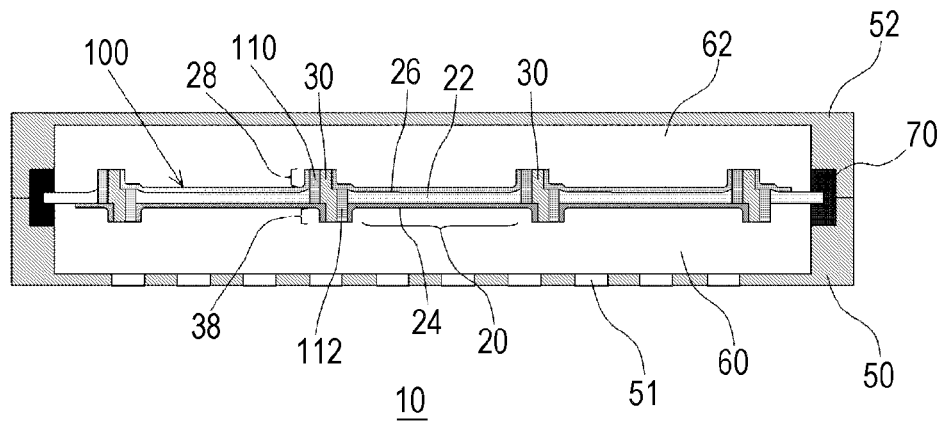
FIG. 15 is a cross-sectional view showing a structure of a fuel CELL according to Embodiment 5.
Figure 16:
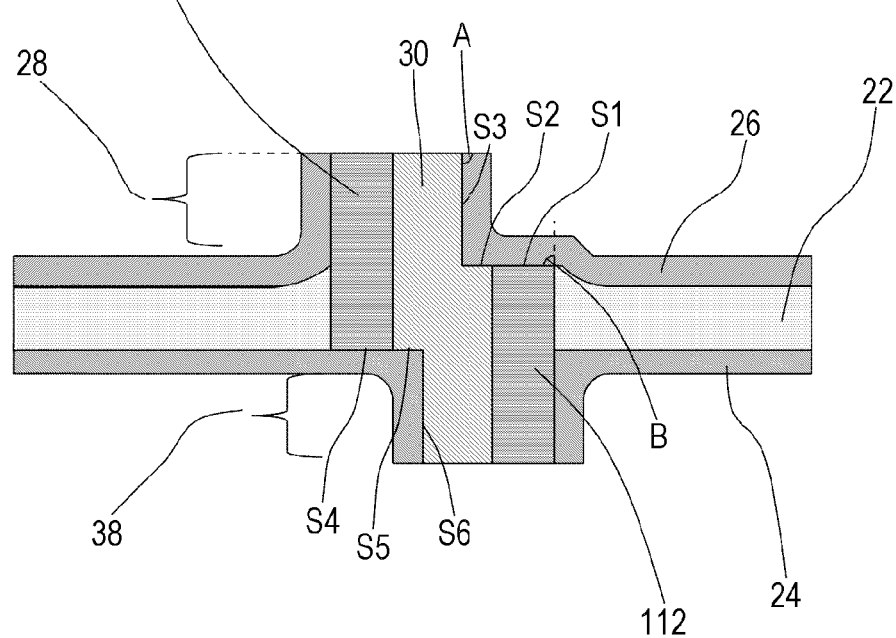
FIG. 16 is an enlarged view of a relevant part showing the structures of an anode-side protruding portion and a cathode-side protruding portion in Embodiment 5.

FIG. 15 is a cross-sectional view showing a structure of a fuel CELL according to Embodiment 5. FIG. 16 is an enlarged view of a relevant part showing the structures of an anode-side protruding portion and a cathode-side protruding portion of Embodiment 5. The basic structure of the fuel CELL 10 of this embodiment is the same as that of Embodiment 3 and descriptions for the features similar to Embodiment 3 are omitted to avoid redundancy.

In the anode-side protruding portion 28, the interconnector 30 has a step surface S3, which is the portion not covered with the second insulator 112 and is receded from a side surface of the interconnector 30 covered with the second insulator 112. In other words, a step not covered with the second insulator 112 is formed in the interconnector 30 in the anode-side protruding portion 28. A step side surface S2 of the step and an anode-side protruding portion 28-side end surface S1 of the second insulator 112 are flush with each other.

In the cathode-side protruding portion 38, the interconnector 30 has a step surface S6, which is the portion not covered with the first insulator 110 and is receded from a side surface of the interconnector 30 covered with the first insulator 110. In other words, a step not covered with the first insulator 110 is formed in the interconnector 30 in the cathode-side protruding portion 38. A step side surface S5 of the step and a cathode-side protruding portion 38-side end surface S4 of the first insulator 110 are flush with each other.

This embodiment is one of the embodiments in which, in a cross-section taken along a direction in which the membrane electrode assemblies 20 are adjacent to one another, the chamfered portion of the interconnector 30 and the first insulator 110 and the chamfered portion of the interconnector 30 and the second insulator 111 are receded from a line connecting two ends of each chamfered portion (located on the interconnector 30-side of the line connecting the two ends of the chamfered portion). In the chamfered portion having such a structure, the chamfered angle (angle A and angle B in FIG. 3, 90 degrees in this embodiment) at the two ends of the chamfered portion is preferably 90 degrees or less. In this manner, the interconnector 30 and the second insulator 112 can reliably contact the anode 26. In Embodiment 5 also, the coating layer 400 and the coating layer 410 can be formed as in Embodiment 2.

(Method for Producing Fuel CELL According to Embodiment 5)

Figure 17:
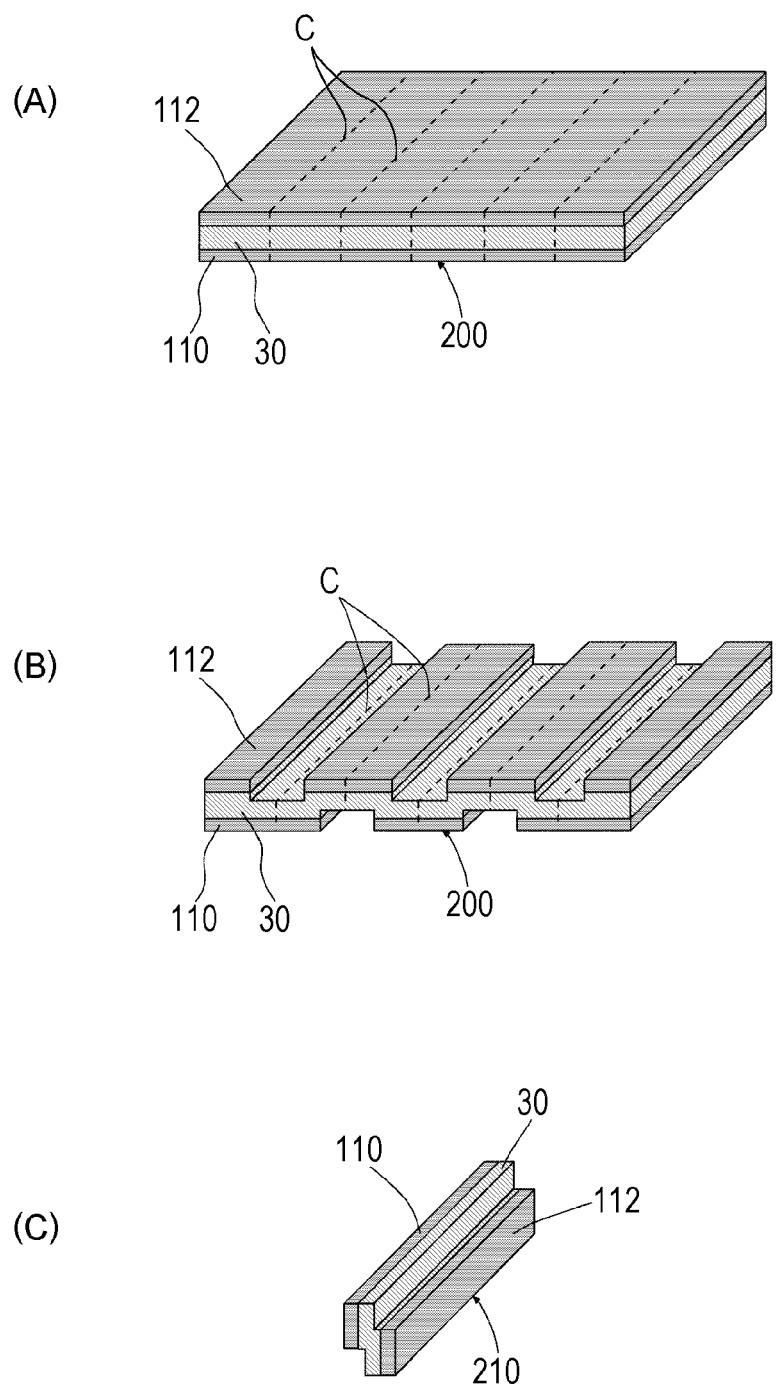
FIG. 17 includes step diagrams illustrating a method for producing a composite film used in the fuel CELL of Embodiment 5.
Figure 18:
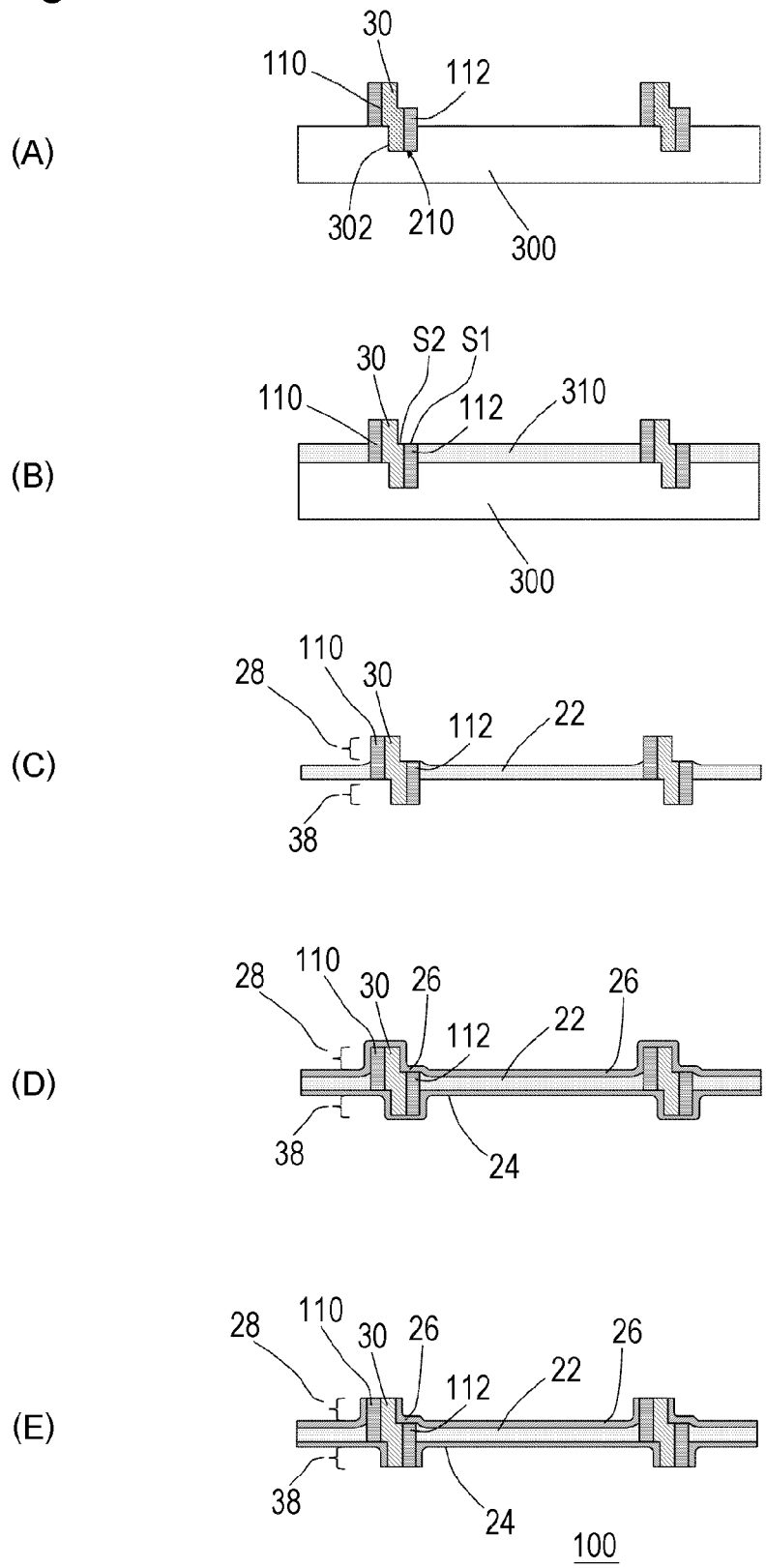
FIG. 18 includes step diagrams illustrating a method for producing a composite film used in the fuel CELL of Embodiment 5.

Of the method for producing a fuel CELL according to Embodiment 3, a method for fabricating a composite film 100 is described in particular with reference to FIGS. 17 to 18.

First, as shown in FIG. 17(A), a laminate 200 in which the first insulator 110 and the second insulator 112 are respectively stacked on two sides of the interconnector 30 is prepared. The first insulator 110 and the second insulator 112 each have a thickness of 0.1 mm, for example.

Next, as shown in FIG. 17(B), the second insulator 112 and the second insulator 112-side interconnector 30 are partly and selectively removed by laser processing. The regions of the second insulator 112 and the interconnector 30 to be removed extend along every other cutting lines C among a plurality of cutting lines C parallel to each other. Each region in which removal is conducted has a width with a cutting line C as the center line. Similarly, the first insulator 110 and the first insulator 110-side interconnector 30 are partly and selectively removed by laser processing. The regions of the first insulator 110 and the interconnector 30 to be removed extend along every other cutting lines C among a plurality of cutting lines C parallel to each other. Each region in which removal is conducted has a width with a cutting line C as the center line. The regions from which the first insulator 110 is removed and the regions from which the second insulator 112 is removed are formed in a staggered manner with the interconnector 30 interposed therebetween.

Then the laminate 200 is cut along the cutting lines C to form individual rod-shaped composite materials 210.

Next, as shown in FIG. 18(A), the composite materials 210 are placed on a base 300 by fitting a part of each composite material 210 into a groove 302 so that the layer stacking direction in the composite material 210 is coincident with the surface direction of the base 300.

Next, as shown in FIG. 18(B), an electrolyte solution 310 containing an ion exchange material such as Nafion is applied between a pair of the composite materials 210. During this process, if the electrolyte solution 310 is applied to the end surface S1 of the second insulator 112 and/or the step side surface S2 of the interconnector 30, the undesirable electrolyte solution 310 applied to such surfaces is removed by using a jig such as a knife.

Next, as shown in FIG. 18(C), the electrolyte solution is dried to form the electrolyte membrane 22. As the solvent is removed, the thickness of the electrolyte membrane 22 becomes smaller than the thickness of the electrolyte solution 310 shown in FIG. 11(B). A part of the composite material 210 protruding from the anode surface of the electrolyte membrane 22 forms a part of the anode-side protruding portion 28. A part of the composite material 210 protruding from the cathode surface of the electrolyte membrane 22 forms a part of the cathode-side protruding portion 38.

Next, as shown in FIG. 18(D), an anode catalyst slurry is applied to the anode surface of the electrolyte membrane 22 and the anode-side protruding portion 28 by a spray coating method to form an anode 26. During this process, the interconnector 30 exposed in one of the side surfaces of the anode-side protruding portion 28 connects to the anode 26. A cathode catalyst slurry is applied to the cathode surface of the electrolyte membrane 22 and the cathode-side protruding portion 38 by a spray coating method so as to form a cathode 24. During this process, the interconnector 30 exposed in the other side surface of the cathode-side protruding portion 38 connects to the cathode 24.

Next, as shown in FIG. 18(E), the anode 26 formed at the top of the anode-side protruding portion 28 is removed by using a spatula, a blade, or the like so as to form a flat exposed surface at the top of the anode-side protruding portion 28. Similarly, the cathode 24 at the top of the cathode-side protruding portion 38 is removed by using a spatula, a blade, or the like so as to form a flat exposed surface at the top of the cathode-side protruding portion 38.

A composite film 100 used in the fuel CELL of Embodiment 5 is fabricated through the above-described steps.

As shown in FIG. 16, in the step of the interconnector 30 in the anode-side protruding portion 28 in the fuel CELL 10 of this embodiment, the step surface S3 and the step side surface S2 contact the anode 26. Accordingly, the area of contact between the interconnector 30 and the anode 26 can be increased compared to Embodiment 3. Moreover, in the step in the interconnector 30 of the cathode-side protruding portion 38, the step surface S6 and the step side surface S5 are in contact with the cathode 24. Accordingly, the area of contact between the interconnector 30 and the cathode 24 can be increased compared to Embodiment 3. As a result, the resistance between the interconnector 30 and each electrode can be decreased.

In the step shown in FIG. 18(B), the excess electrolyte solution can be easily removed without damaging the electrolyte solution in the needed portion by sliding a jig such as a knife over the step side surface S2 using the step surface S3 as a guide.

According to the methods for producing a fuel CELL of the embodiments described above, a composite film for a fuel CELL in which cells are integrated can be easily fabricated without using laser processing to form individual cells. Since laser processing is not employed to form individual cells, generation of ash resulting from laser irradiation is avoided. Accordingly, the electrolyte membranes and catalyst layers can be kept clean.

According to a method for producing a fuel CELL of Embodiment 2, presence of the coating layer 400 and the coating layer 410 more reliably electrically insulates between the interconnector 30 and the anode or cathode to which the interconnector 30 should not be connected.

According to a method for producing a fuel CELL of Embodiment 4, presence of the first insulator 110 and the second insulator 112 more reliably electrically insulates between the interconnector 30 and the anode or cathode to which the interconnector 30 should not be connected.

Although the protruding portions are formed on both the anode side and the cathode side, a protruding portion may be formed in only one of the anode side and the cathode side. On the side where the protruding portion is not formed, for example, surfaces of the electrolyte membrane, the interconnector, and the insulator that insulates between the electrolyte membrane and the interconnector may be arranged to be substantially flush with each other and then cathodes or anodes may be formed by using a mask so that they are in individual regions corresponding to the cells.

REFERENCE SIGNS LIST 10 fuel CELL, 20 membrane electrode assembly, 22 electrolyte membrane, 24 cathode, 26 anode, 28 anode-side protruding portion, 30 interconnector, 38 cathode-side protruding portion, 50 cathode housing, 52 anode housing, 60 air chamber, 62 fuel gas chamber, 100 composite film

INDUSTRIAL APPLICABILITY

The present invention is applicable to fuel cell.

The invention claimed is:
1. A fuel cell comprising:
a plurality of membrane electrode assemblies in a flat arrangement, each membrane electrode assembly including an electrolyte membrane, an anode formed on one surface of the electrolyte membrane, and a cathode formed on another surface of the electrolyte membrane, the anode, electrolyte membrane and cathode being sandwiched in a first direction, and extending in a second direction perpendicular to the first direction;
an interconnector disposed between the membrane electrode assemblies adjacent to each other, and electrically connecting the membrane electrode assemblies adjacent to each other, the interconnector being made of conductive material;
an insulator disposed adjacent to the interconnector; and
at least one protruding portion disposed between the membrane electrode assemblies adjacent to each other and having a flat top surface, the protruding portion either:
(a) comprising a part of the anode, an anode-side part of the interconnector and an anode-side part of the insulator, and protruding with respect to a surface of the anode which is opposite to a surface of the anode facing the electrolyte membrane in regions of main surfaces of the electrolyte membrane, the protruding portion protruding in a direction intersecting with the second direction, the interconnector electrically contacting the anode at an anode contacting region of the interconnector, the insulator forming a part of the top surface and, in the protruding portion, electrically insulating the interconnector and the anode of an adjacent membrane electrode assembly, or

(b) comprising a part of the cathode, a cathode-side part of the interconnector and a cathode-side part of the insulator, and protruding with respect to a surface of the cathode which is opposite to a surface of the cathode facing the electrolyte membrane in regions of main surfaces of the electrolyte membrane, the protruding portion protruding in a direction intersecting with the second direction, the interconnector electrically contacting the cathode at a cathode contacting region of the interconnector, the insulator forming a part of the top surface and, in the protruding portion, electrically insulating the interconnector and the cathode of an adjacent membrane electrode assembly, wherein:
the anode contacting region is a chamfered portion formed at a top of the anode-side part of the interconnector, or
the cathode contacting region is a chamfered portion formed at a top of the cathode-side part of the interconnector.

2. A fuel cell comprising:
a plurality of membrane electrode assemblies in a flat arrangement, each membrane electrode assembly including an electrolyte membrane, an anode formed on one surface of the electrolyte membrane, and a cathode formed on another surface of the electrolyte membrane, the anode, electrolyte membrane and cathode being sandwiched in a first direction, and extending in a second direction perpendicular to the first direction;
an interconnector disposed between the membrane electrode assemblies adjacent to each other, and electrically connecting the membrane electrode assemblies adjacent to each other, the interconnector being made of conductive material;
an insulator disposed adjacent to the interconnector; and
at least one protruding portion disposed between the membrane electrode assemblies adjacent to each other and having a flat top surface, the protruding portion either:
(a) comprising a part of the anode, an anode-side part of the interconnector and an anode-side part of the insulator, and protruding with respect to a surface of the anode which is opposite to a surface of the anode facing the electrolyte membrane in regions of main surfaces of the electrolyte membrane, the protruding portion protruding in a direction intersecting with the second direction, the interconnector electrically contacting the anode at an anode contacting region of the interconnector, the insulator forming a part of the top surface and, in the protruding portion, electrically insulating the interconnector and the anode of an adjacent membrane electrode assembly, or
(b) comprising a part of the cathode, a cathode-side part of the interconnector and a cathode-side part of the insulator, and protruding with respect to a surface of the cathode which is opposite to a surface of the cathode facing the electrolyte membrane in regions of main surfaces of the electrolyte membrane, the protruding portion protruding in a direction intersecting with the second direction, the interconnector electrically contacting the cathode at a cathode contacting region of the interconnector, the insulator forming a part of the top surface and, in the protruding portion, electrically insulating the interconnector and the cathode of an adjacent membrane electrode assembly, wherein:
the top surface of the protruding portion at an anode side is a combined surface in which an end surface of the anode extending from one of the membrane electrode assemblies, an end surface of the anode-side part of the interconnector, an end surface of the anode-side part of the insulator, and an end surface of the anode extending from the other membrane electrode assembly are arranged in that order, or
the top surface of the protruding portion at a cathode side is a combined surface in which an end surface of the cathode extending from one of the membrane electrode assemblies, an end surface of the cathode-side part of the interconnector, an end surface of the cathode-side part of the insulator, and an end surface of the cathode extending from the other membrane electrode assembly are arranged in that order.

3. The fuel cell according to claim 1, wherein, in a cross-section taken in the second direction, the chamfered portion is receded from a line that connects both ends of the chamfered portion.

4. The fuel cell according to claim 1, wherein:
the top surface of the protruding portion at an anode side is a combined surface in which an end surface of the anode extending from one of the membrane electrode assemblies, an end surface of the anode-side part of the interconnector, an end surface of the anode-side part of the insulator, and an end surface of the anode extending from the other membrane electrode assembly are stacked in that order, or
the top surface of the protruding portion at a cathode side is a combined surface in which an end surface of the cathode extending from one of the membrane electrode assemblies, an end surface of the cathode-side part of the interconnector, an end surface of the cathode-side part of the insulator, and an end surface of the cathode extending from the other membrane electrode assembly are arranged in that order.

5. The fuel cell according to claim 2, wherein, in a cross-section taken in the second direction, the chamfered portion is receded from a line that connects both ends of the chamfered portion.

6. A fuel cell comprising:
a plurality of membrane electrode assemblies in a flat arrangement, each membrane electrode assembly including an electrolyte membrane, an anode formed on one surface of the electrolyte membrane, and a cathode formed on another surface of the electrolyte membrane, the anode, electrolyte membrane and cathode being sandwiched in a first direction, and extending in a second direction perpendicular to the first direction;
an interconnector disposed between the membrane electrode assemblies adjacent to each other, and electrically connecting the membrane electrode assemblies adjacent to each other, the interconnector being made of conductive material;
an insulator disposed adjacent to the interconnector; and
at least one protruding portion disposed between the membrane electrode assemblies adjacent to each other and having a flat top surface, the protruding portion either:
(a) comprising a part of the anode, an anode-side part of the interconnector and an anode-side part of the insulator, and protruding with respect to a surface of the anode which is opposite to a surface of the anode facing the electrolyte membrane in regions of main surfaces of the electrolyte membrane, the protruding portion protruding in a direction intersecting with the second direction, the interconnector electrically contacting the anode at an anode contacting region of the interconnector, the insulator forming a part of the top surface and, in the protruding portion, electrically insulating the interconnector and the anode of an adjacent membrane electrode assembly, or (b) comprising a part of the cathode, a cathode-side part of the interconnector and a cathode-side part of the insulator, and protruding with respect to a surface of the cathode which is opposite to a surface of the cathode facing the electrolyte membrane in regions of main surfaces of the electrolyte membrane, the protruding portion protruding in a direction intersecting with the second direction, the interconnector electrically contacting the cathode at a cathode contacting region of the interconnector, the insulator forming a part of the top surface and, in the protruding portion, electrically insulating the interconnector and the cathode of an adjacent membrane electrode assembly, the anode of the adjacent membrane electrode assembly is formed on a side surface of the anode-side part of the insulator, or the cathode of the adjacent membrane electrode assembly is formed on a side surface of the cathode-side part of the insulator.

\* \* \* \* \*